United States Patent
Ogawa

(10) Patent No.: US 11,936,827 B2
(45) Date of Patent: Mar. 19, 2024

(54) IMAGE FORMING APPARATUS CAPABLE OF PERFORMING CROP PROCESSING, CONTROL METHOD, AND NON-TRANSITORY COMPUTER-READABLE MEDIUM STORING CONTROL PROGRAM

(71) Applicant: SHARP KABUSHIKI KAISHA, Sakai (JP)

(72) Inventor: Kazuma Ogawa, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 18/082,490

(22) Filed: Dec. 15, 2022

(65) Prior Publication Data
US 2023/0208993 A1 Jun. 29, 2023

(30) Foreign Application Priority Data
Dec. 23, 2021 (JP) ................. 2021-209103

(51) Int. Cl.
H04N 1/04 (2006.01)
H04N 1/00 (2006.01)

(52) U.S. Cl.
CPC ..... H04N 1/00816 (2013.01); H04N 1/00822 (2013.01)

(58) Field of Classification Search
None
See application file for complete search history.

(56) References Cited

U.S. PATENT DOCUMENTS

| | | | |
|---|---|---|---|
| 8,902,480 B1* | 12/2014 | Taniguchi | H04N 1/0443 358/475 |
| 2006/0250661 A1* | 11/2006 | Susaki | H04N 1/401 358/461 |
| 2021/0127025 A1* | 4/2021 | Horiguchi | H04N 1/00737 |
| 2022/0337717 A1* | 10/2022 | Fujisaki | H04N 1/00816 |
| 2022/0385778 A1* | 12/2022 | Fukutome | H04N 1/00785 |
| 2023/0069064 A1* | 3/2023 | Ogawa | G06T 7/11 |

FOREIGN PATENT DOCUMENTS

| | | |
|---|---|---|
| JP | 2011-086988 A | 4/2011 |
| JP | 2017-201767 A | 11/2017 |

* cited by examiner

*Primary Examiner* — Dung D Tran
(74) *Attorney, Agent, or Firm* — ScienBiziP, P.C.

(57) ABSTRACT

An image forming apparatus includes a light transmitting member provided at a reading position set in a conveyance path and an opposite plate opposed thereto, and a document being conveyed passes between this opposite plate and the light transmitting member. On an opposing surface of the opposite plate to the light transmitting member, a low brightness area, for example, like a gray color and a high brightness area, for example, like a white color, having a higher brightness than the low brightness area are formed adjacent to each other in a conveyance direction of the document. Then, an image reader sets a home position of a scanning unit to a first position or a second position corresponding to either the low brightness area or the high brightness area to read the document passing through the reading position.

3 Claims, 14 Drawing Sheets

IMAGE FORMING APPARATUS CAPABLE OF PERFORMING CROP PROCESSING, CONTROL METHOD, AND NON-TRANSITORY COMPUTER-READABLE MEDIUM STORING CONTROL PROGRAM

BACKGROUND OF THE INVENTION

Field of the Invention

The present disclosure relates to an image forming apparatus, a control method and a storage medium storing a program therefor, in particular to an image forming apparatus, a control method, and a storage medium storing a program therefor having a crop function.

Description of the Background Art

As a first example of this type of technique, while document images read from a document placed on a document table is cropped, there is displayed a warning screen that prompts a user to rearrange the document on the document table in a case where a detection of the document images fails.

On the other hand, as a second example, such a configuration is known that an image on a surface of a document during an automatic conveyance is read at a reading position, so to speak, in a flow reading method.

The technique in the first example is not applicable to a flow reading method like the second example.

Therefore, a primary object of the present disclosure is to provide a novel image forming apparatus, a storage medium storing a control method and a program therefor.

Another object of the present disclosure is to provide an image forming apparatus, a control method, and a storage medium storing a program therefor that can detect document images in a flow reading method.

SUMMARY OF THE INVENTION

A first disclosure relates to an image forming apparatus using a flow reading method that reads a document by irradiating the document with light from a scanning unit, at a reading position set in a conveyance path, and comprises a conveyance section that conveys the document along the conveyance path, a light transmitting member that is provided below the conveyance path at the reading position, an opposite plate that is provided opposite to the light transmitting member and that allows the document being conveyed to pass between the opposite plate and the light transmitting member, wherein on an opposing surface of the opposite plate to the light transmitting member, a low brightness area and a high brightness area having a higher brightness than the low brightness area are formed adjacent to each other in a conveyance direction of the document, and an image reader that sets a home position of the scanning unit to a position corresponding to either the low brightness area or the high brightness area to read the document passing through the reading position.

In the first disclosure, the image forming apparatus (10: reference character illustrating a corresponding portion in embodiments, which also applies hereinbelow) is an image forming apparatus using a flow reading method that reads the document by irradiating the document (100) with light from the scanning unit (52) at the reading position (P1) set in the conveyance path (40). The conveyance section (38) conveys the document along the conveyance path. The light transmitting member (16) is provided below the conveyor path at the reading position (P1), and the reading opposite plate (26) is provided opposite to the light transmitting member. The document being conveyed passes between this opposite plate and the light transmitting member. On the opposing surface of the reading opposite plate (26) to the light transmitting member (16), the low brightness area (26G), for example, like a gray color and the high brightness area (26W), for example, like a white color, having a higher brightness than the low brightness area are formed adjacent to each other in the conveyance direction of the document. Then, the image reader (12) sets the home position of the scanning unit (52) to a position corresponding to either the low brightness area or the high brightness area to read the document passing through the reading position (P1).

According to the first disclosure, a document image can certainly be detected from the read image data regardless of the ground color of the document by setting the home position of the scanning unit to the position corresponding to the low-brightness area or the high brightness area.

A second disclosure relates to an image forming apparatus using a flow reading method that reads a document by irradiating the document with light from a scanning unit, at a reading position set in a conveyance path, and comprises the conveyance section that conveys the document along the conveyance path, a light transmitting member that is provided below the conveyance path at the reading position, and an opposite plate that is provided opposite to the light transmitting member and that allows the document being conveyed to pass between the opposite plate and the light transmitting member, wherein on an opposing surface of the opposite plate to the light transmitting member, a low brightness area and a high brightness area having higher brightness than the low brightness area are formed adjacent to each other in a conveyance direction of the document.

According to the second disclosure, since the home position of the scanning unit can be set to the position corresponding to the low-brightness area or the high-brightness area, a document image can certainly be detected regardless of the ground color of the document.

A third disclosure relates to an image forming apparatus using a flow reading method that reads a document by irradiating the document with light from a scanning unit, at a reading position set in a conveyance path, and comprises a conveyance section that conveys the document along the conveyance path, a light transmitting member that is provided below the conveyance path at the reading position, an opposite plate that is provided opposite to the light transmitting member and that allows the document being conveyed to pass between the opposite plate and the light transmitting member, wherein on an opposing surface of the opposite plate to the light transmitting member, a low brightness area and a high brightness area having a higher brightness than the low brightness area are formed adjacent to each other in a conveyance direction of the document, a first reading execution section that sets a home position of the scanning unit to a position corresponding to the low brightness area to read the document passing through the reading position by an image reader, a determination section that determines whether a document image has been able to be detected from image data obtained at the time of a first reading by the first reading execution section, and a second reading execution section that sets the home position of the scanning unit to a position corresponding to the high brightness area to read the document passing through the reading position by the image reader in a case where the determination section determines that the document image has not been able to be detected from the image data.

In the third disclosure, the image forming apparatus (10) is an image forming apparatus using a flow reading method that reads the document by irradiating the document (100) with light from the scanning unit (52) at the reading position (P1) set in the conveyance path (40). The conveyance section (38) conveys the document (100) along the conveyance path. The light transmitting member (16) is provided below the conveyor path at the reading position (P1), and the reading opposite plate (26) is provided opposite to this light transmitting member. The document being conveyed passes between this opposite plate and the light transmitting member. On the opposing surface of the reading opposite plate (26) to the light transmitting member (16), the low brightness area (26G), for example, like a gray color and the high brightness area (26W), for example, like a white color, having a higher brightness than the low brightness area are formed adjacent to each other in the conveyance direction of the document. The first reading execution section (76, 12, S1, S31) sets the home position of the scanning unit (52) to the first position corresponding to the low light area (26G) to read the document that passes through the reading position by the image reader. The determination section (76, 28, S5, S33) determines whether the document image has been able to be detected from the image data obtained at the time of the first reading by the first reading execution section. Then, the second reading execution section (76, 12, S15, and S59) sets the home position of the scanning unit (52) to the second position corresponding to the high brightness area (26W) to read the document passing through the reading position by the image reader.

According to the third disclosure, in a case where a document image has not been able to be detected from read image data as a result of reading being executed by the first reading execution section that set the home position of the scanning unit to the first position corresponding to the low brightness area, the document image can certainly be read since the second reading is executed by the second reading execution section that sets the home position of the scanning unit to a second position corresponding to the high brightness area.

A fourth disclosure relates to an image forming apparatus using a flow reading method that reads a document by irradiating the document with light from a scanning unit, at a reading position set in a conveyance path, and comprises a conveyance section that conveys the document along the conveyance path, a light transmitting member that is provided below the conveyance path at the reading position, and an opposite plate that is provided opposite to the light transmitting member and that allows the document being conveyed to pass between the opposite plate and the light transmitting member, wherein on an opposing surface of the opposite plate to the light transmitting member, a low brightness area and a high brightness area having a higher brightness than the low brightness area are formed adjacent to each other in a conveyance direction of the document, wherein a control method for the image forming apparatus comprises a first reading execution step of setting a home position of the scanning unit to a position corresponding to the low brightness area to read the document passing through the reading position by an image reader, a determination step of determining whether a document image has been able to be detected from image data obtained at the time of a first reading by the first reading execution section, and a second reading execution step of setting the home position of the scanning unit to a position corresponding to the high brightness area to read the document passing through the reading position by the image reader in a case where the determination section determines that a document image has not been able to be detected from the image data.

According to the fourth disclosure, as is in the third disclosure, a document image can certainly be detected.

A fifth disclosure relates to a computer-readable storage medium storing a program for an image forming apparatus using a flow reading method that reads a document by irradiating the document with light from a scanning unit, at a reading position set in a conveyance path, the image forming apparatus including: a conveyance section that conveys the document along the conveyance path; a light transmitting member that is provided below the conveyance path at the reading position; and an opposite plate that is provided opposite to the light transmitting member and that allows the document being conveyed to pass between the opposite plate and the light transmitting member, where on an opposing surface of the opposite plate to the light transmitting member, a low brightness area and a high brightness area having a higher brightness than the low brightness area are formed adjacent to each other in a conveyance direction of the document, and where the program causes a computer of the image forming apparatus to function as a first reading execution section that sets a home position of the scanning unit to a first position corresponding to the low brightness area to read the document passing through the reading position by the image reader, a determination section that determines whether a document image has been able to be detected from image data obtained at the time of the first reading by the first reading execution section, and a second reading execution section that sets the home position of the scanning unit to a second position corresponding to the high brightness area to read the document passing through the reading position by the image reader in a case where the determination section determines that the document image has not been able to be detected from the image data.

According to the fifth disclosure, as is in the third disclosure, a document image can certainly be detected.

According to the present disclosure, since the opposite plate at the reading position forms two areas with a difference in brightness in the conveyance direction (in a sub scanning direction of the scanning unit), a document image can certainly be detected by setting accordingly the home position of the document scanning unit.

BRIEF DESCRIPTION OF THE DRAWINGS

FIGS. 9A and 9B are illustrative diagram showing a case of succeeding in a document image detection (crop processing) by a second reading, in which FIG. 9A shows a case of a failed first reading and FIG. 9B shows a case of a successful second reading.

DESCRIPTION OF THE PREFERRED EMBODIMENTS

Figure 1:
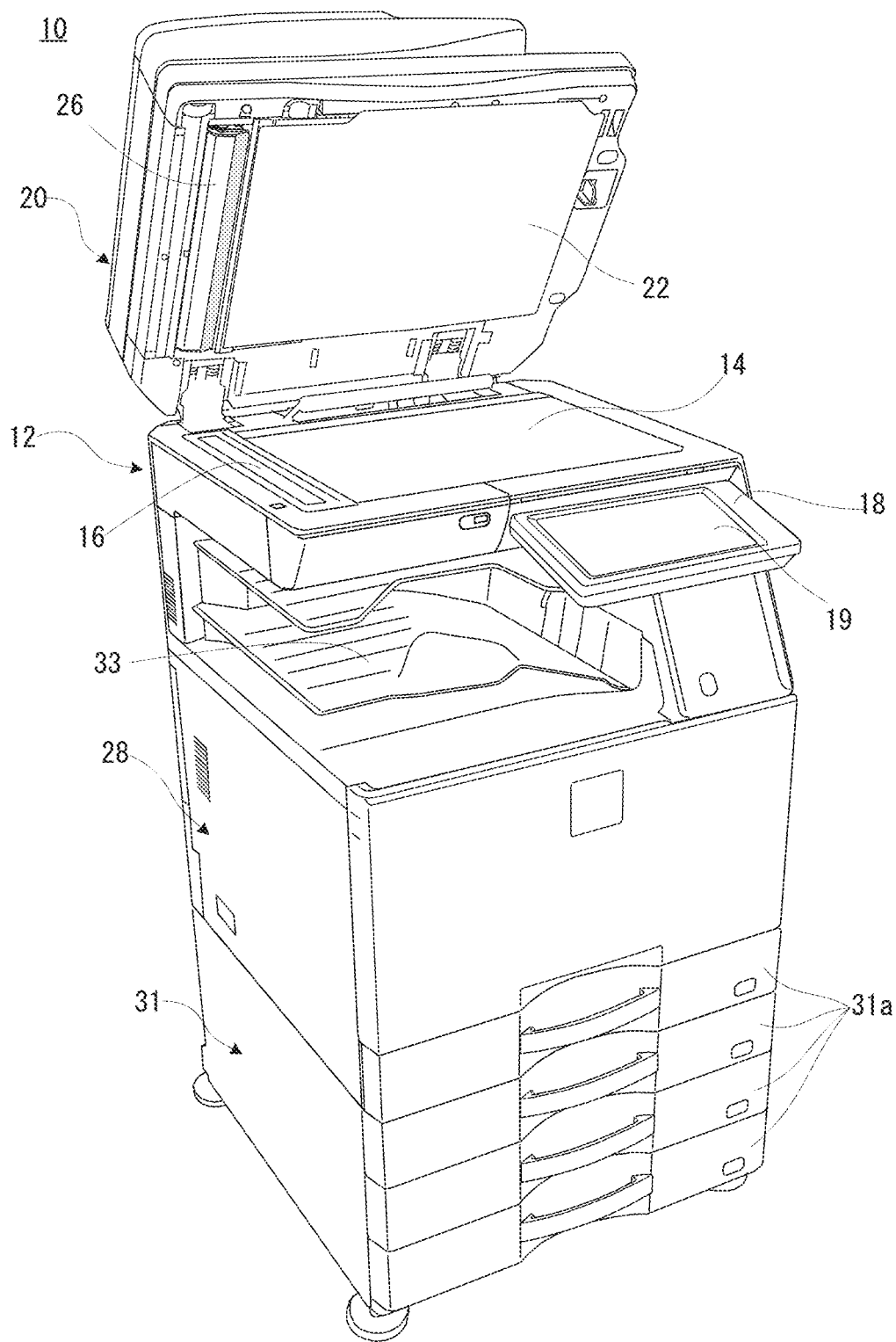
FIG. 1 is an illustrative diagram showing an image forming apparatus according to one embodiment of the present disclosure.

With reference to FIG. 1, an Image forming apparatus 10, which is one embodiment of the present disclosure, is a multifunction peripheral (MFP) as one example, and is provided with multiple functions such as a copy function, an image scanner function, a printer function, and a fax function. However, the present disclosure is applicable to an image forming apparatus provided with a document reading function using, so to speak, a flow reading method, which reads at least every one sheet of a document fed from a document table.

An image reader 12 as one example of an image reading means is provided at an upper part of the image forming apparatus 10. This image reader 12, which will be described in detail later, reads images of a document (not shown) to output image data of the document. The image reader 12 includes a transparent document table 14 on which a document is placed and a transparent reading glass 16 provided at a fixed position (using a flow reading method) to the left of the document table 14. It is noted that in a case where an automatic document feeder provided in a document table cover 20, which will be described later, is called SPF (Single Pass Feeder), this reading glass 16 may be called SPF glass. In addition, although the reading glass 16 is here referred to, it should be understood that since it may be a transparent plastic rather than a glass, the concept of the reading glass 16 includes something like a transparent plastic. That is to say, the reading glass 16 can be considered a light transmitting member at a reading position.

There is provided an operation section 18 at an upper part of the image forming apparatus 10 and at a front part of the image reader 12. There is provided a display 19 with a touch panel on an operation surface of this operation section 18.

The document table cover 20 is provided above the image reader 12 so as to open and close, for example, using a hinge for one side of the rear side of the document table 14. On the underside of the document table cover 20, there is provided a document presser 22 that presses a document placed on the document table 14. There is provided a reading opposite plate 26 opposite to the reading glass 16 to the left of this document presser 22. This embodiment features this reading opposite plate 26, as will be described later.

As one example of an image forming means, an image forming section 30 is provided below the image reader 12. The image forming section 30 prints images based on image data after an image processing is performed by an image processing section 28 (FIG. 11), for example, document images being extracted (detected) to be carried out a crop processing on, and the like on a paper (sheet) as a recording medium. The image forming processing is executed by, for example, a known electrophotographic method. For this purpose, the image forming section 30 is provided with components for image forming such as a photosensitive drum, as is already well known.

A paper feeder 31 is provided as one example of a paper feeding means below the image forming section 30. This paper feeder 31 has four paper feed cassettes 31a in this embodiment. Each one of the paper feed cassette 31a houses a paper of a predetermined size in a predetermined orientation. In addition, although not shown, a manual feed tray is provided on a right side surface of the image forming apparatus 10. The paper feeder 20 applies either one of the paper feed cassettes 31a or the manual feed tray as a paper supply source to supply a paper (sheet) to the image forming section 30 by one sheet unit.

A paper that has been sent from the paper feeder 31 and on which images have been printed by image forming section 30 is discharged to a paper discharge tray 33. In addition, in this embodiment, the paper discharge tray 33 is provided in an in-body space between the image forming section 30 and the image reader 12.

Figure 2:
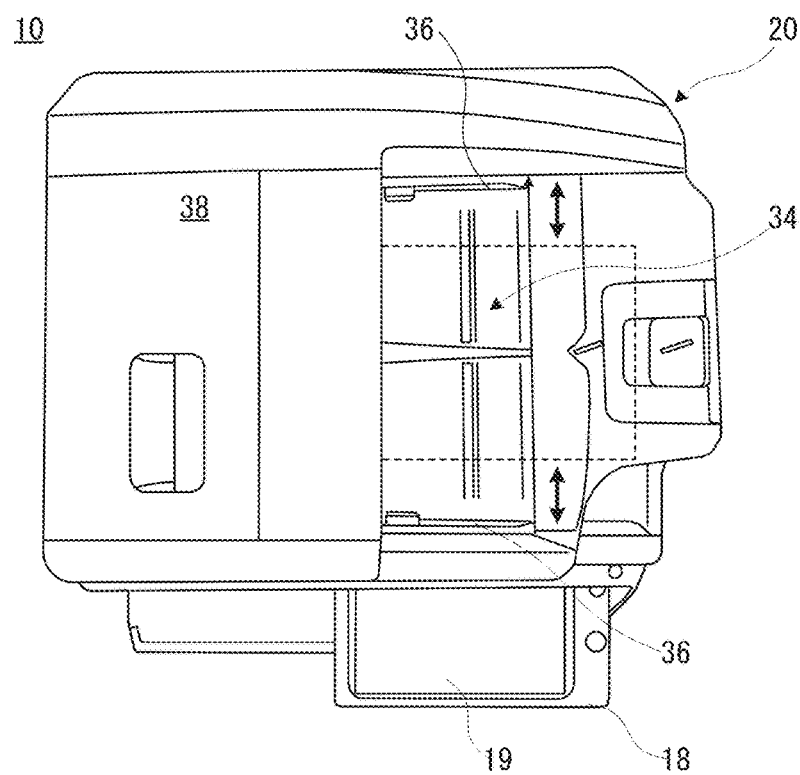
FIG. 2 is an illustrative diagram showing one example of an automatic document feeder according to this embodiment.

As shown in FIG. 2, a document placement tray 34 is formed on a top surface of the document table cover 20. There is provided on the document placement tray 34 a document guide 36 for regulating both side surfaces of a document 100 (FIG. 3) placed thereon.

Figure 3:
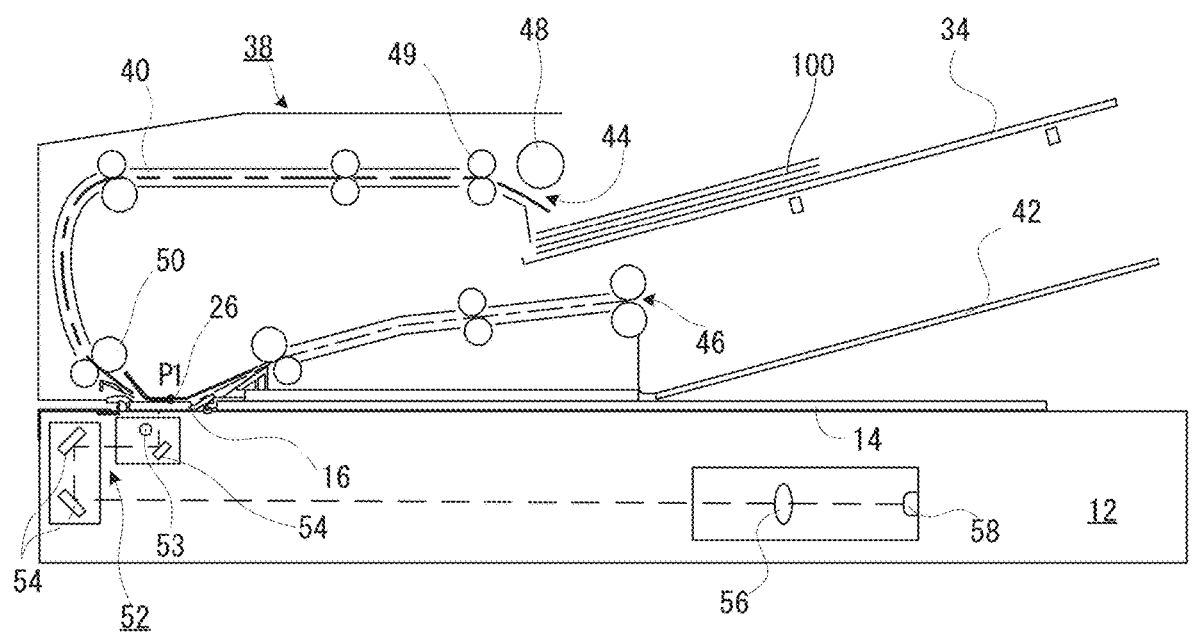
FIG. 3 is an illustrative diagram showing a configuration of an automatic document feeder and an image reader according to this embodiment.

The automatic document feeder 38 that is installed inside the document table cover 20 to form a conveyance section of a document is an ADF (Automatic Document Feeder) or the above-mentioned SPF, and, as shown in FIG. 3, conveys every one sheet of the document 100 stacked on the document placement tray 34 through a document conveyance path 40 to a document discharge tray 42.

That is to say, the document conveyance path 40 runs from a paper feed slot 44 of the document placement tray 34 to a paper discharge slot 46 at a side of the document discharge tray 42.

In a vicinity of the paper feed slot 44 of the document conveyance path 40, there is provided a pickup roller 48 for taking out every one sheet of the document 100 placed on the document placement tray 34. The document 100 taken out from the document placement tray 34 by this pickup roller 48 is taken into the document conveyance path 40 from the paper feed slot 44. For this purpose, a paper feed roller set 49 is provided at an end of a side of the paper feed slot 44 of the document conveyance path 40.

In addition, the document conveyance path 40 has a plurality of conveyance roller sets provided at a proper position. These conveyance roller sets convey the document 100 taken into and along the document conveyance path 40 (so as to follow).

The document conveyance path 40 has a portion in contact with the top surface of the reading glass 16 to the left of the document table 14, and a reading position P1 of the image reader 12 is set at a portion of a reading opposite plate 26 opposite to this reading glass 16.

That is to say, the document 100, in a case of being conveyed along the document conveyance path 40, passes through the reading position P1 on the way. As a result, surface images of the document 100 can be read so called in a flow reading method. In addition, there is provided immediately before the reading position P1 (closest position at the upstream side) in a conveyance direction of the document 100 a resist roller 50 for adjusting a timing for supplying the document 100 to the reading position P1.

As described above, the image reader 12 has a housing provided with the transparent document placement table 14 on the upper surface thereof, and there is provided inside the housing a scanning unit 52 that can move (scan) in a main scanning direction and in a sub scanning direction. The main scanning direction is a direction orthogonal to a paper surface in FIG. 3, and the sub scanning direction is a left and right direction of the paper on which in FIG. 3 is drawn (direction for conveying a document). The scanning unit 52 includes a light source 53 that irradiates (exposes) a surface of the document (100) with light and a mirror 54 that reflects the reflected light from the surface of the document irradiated by the light source 53. The image reader 12 is further provided with an imaging lens 56 that receives the reflected light from the document reflected by the mirror 54 of the scanning unit 52, a reading sensor 58 (line sensor), and the like.

In a case where images on the surface of the document 100 are read by the image reader 12, the light source 53 of the scanning unit 52 exposes the surface of the document 100 at the reading position P1, and the reflected light reflected from the surface of the document is reflected by the mirror 54 to be guided to the imaging lens 56. Then, the reflected light is imaged on the light receiving element (not shown) of the reading sensor 58 by the imaging lens 56. The reading sensor 58, such as a CCD (Charge Coupled Device), detects brightness and chromaticity of the reflected light that has been imaged, and generates image data including document images and background color images due to the reading opposite plate 26.

The image reader 12 is available in a fixed reading by which images of the document 100 placed on the document table 14 are read and in a flow reading by which images of the document 100 conveyed by the automatic document feeder 38 through the document conveyance path 40 are read.

In a case of a fixed reading, the image reader 12 reads the document image by moving the scanning unit 52 including the light source 53 and the plurality of mirrors 54 in the main scanning direction and the sub scanning direction below the document placement table 14. In this case, the document presser 22 (FIG. 1) becomes a background color of the document. Generally, the color of the document presser 22, that is to say, the background color in a case of a fixed reading is a white color.

On the other hand, in a case of a flow reading, the image reader 12 reads by irradiating the surface of the document 100 with light from the light source 53 through the reading glass 16 when the image reader 12 makes the scanning unit 52 stand by below the reading position P1 which is a home position thereof and the document 100 that is conveyed by the automatic document feeder 38 passes the reading position P1. In this case, the reading opposite plate 26 forms a background color of the document passing through the reading position P1.

Figure 4:
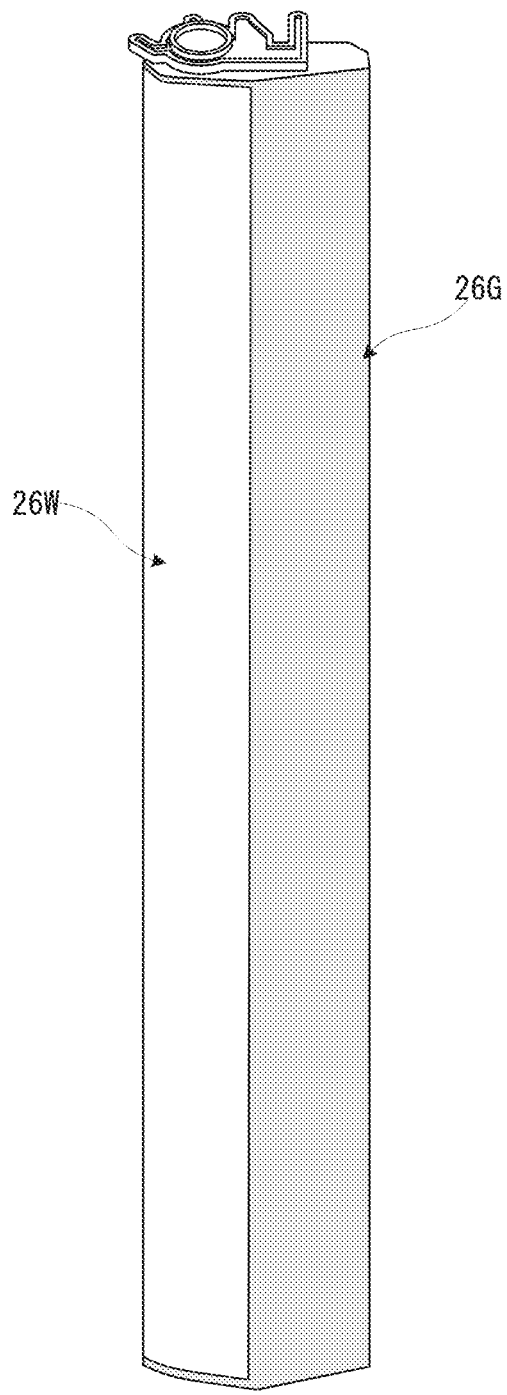
FIG. 4 is an illustrative diagram showing one example of a reading opposite plate used in this embodiment.

In this embodiment, as shown in FIG. 4, the reading opposite plate 26 of the reading glass 16 through which the document passes in the case of a flow reading is differently colored into two areas in the document conveyance direction, that is to say, in the above-mentioned sub scanning direction. In other words, the reading opposite plate 26 forms a white color area 26W on the left side in FIG. 4 on the upstream side in the sub scanning direction, and forms a gray color area 26G on the right side in FIG. 4 on the downstream side in the main scanning direction. Thus, in a case where the document passes through the white color area 26W, the background color becomes a white color, and in a case where the document passes through the gray area 26W, the background color becomes a gray color.

Figure 5:
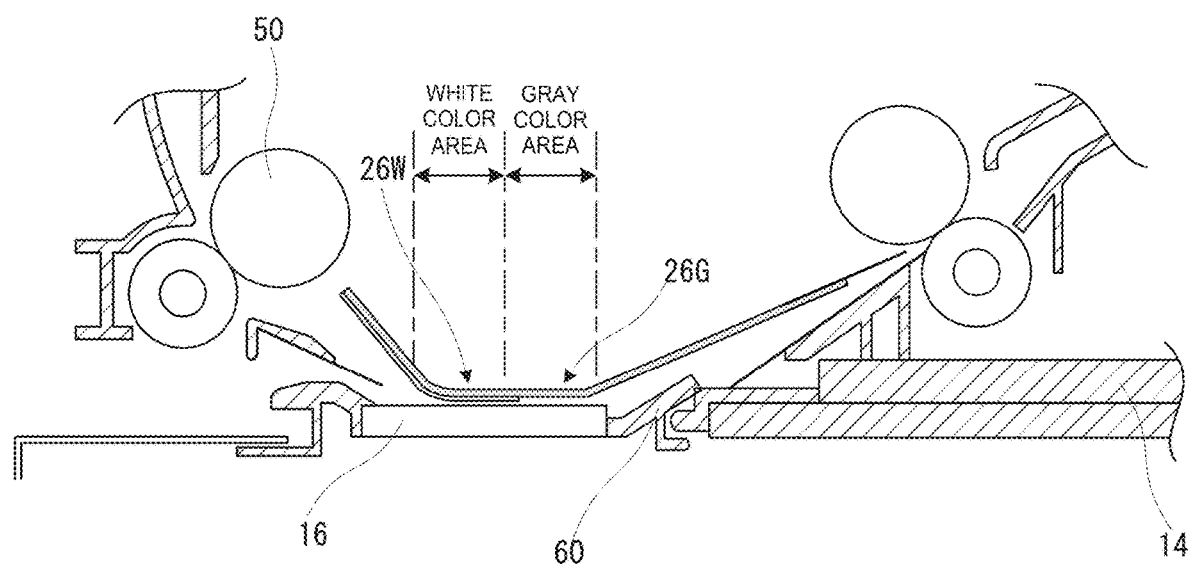
FIG. 5 is an enlarged illustrative diagram showing a configuration in a vicinity of this opposite plate.

As the structure in the vicinity of this reading opposite plate 26 is shown in enlarged FIG. 5, the document (not shown) whose passing timing has been adjusted by the resist roller 50 is conveyed through a gap between the reading glass 16 and the reading opposite plate 26 to be guided by an upward inclined surface of an inclined guide 60, and sent onto the document discharge tray 42 (FIG. 3).

Figure 6:
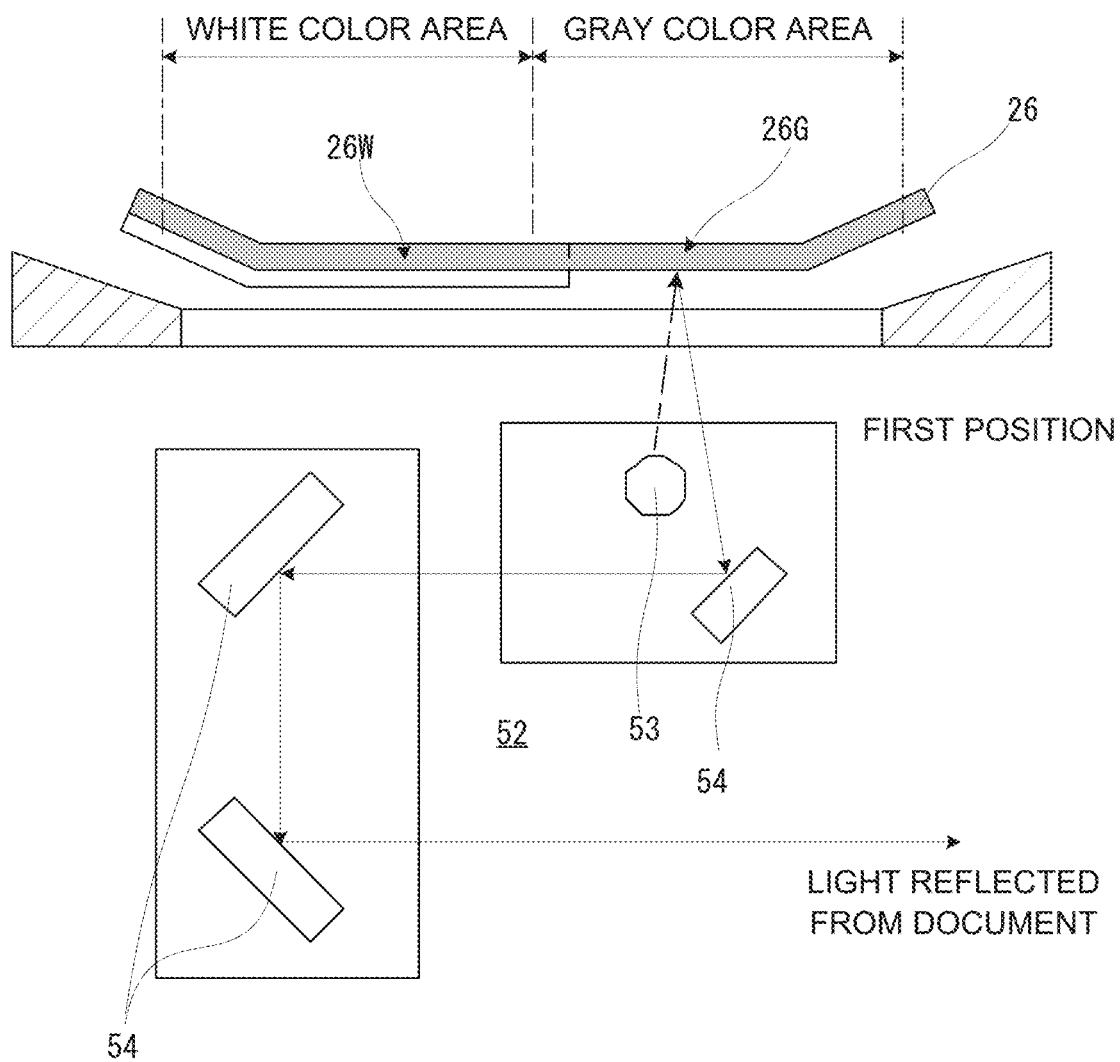
FIG. 6 is an illustrative diagram showing a first position of a scanning unit in a case of using the opposite plate of the embodiment according to FIG. 5.
Figure 7:
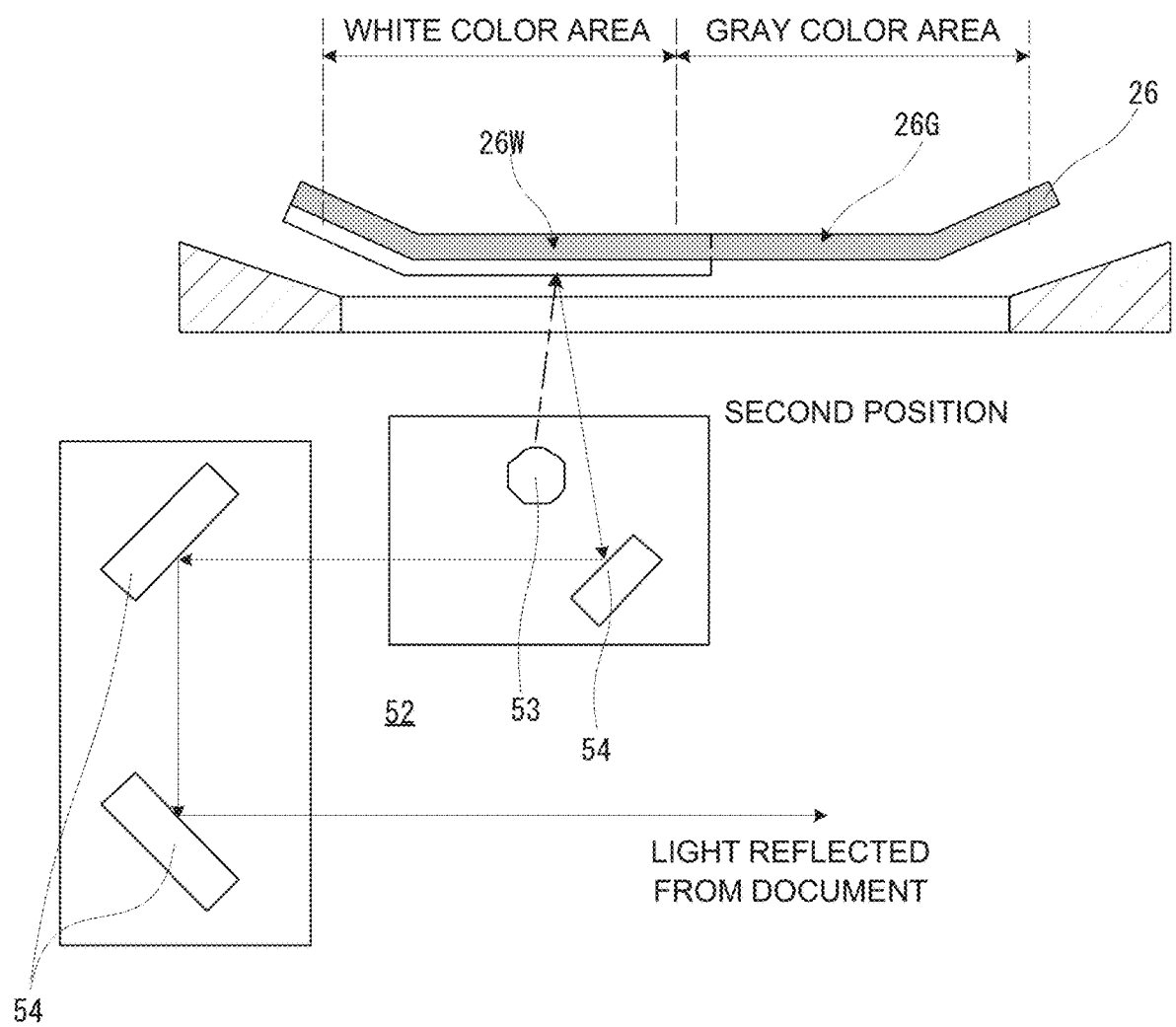
FIG. 7 is an illustrative diagram showing a second position of a scanning unit in a case of using the opposite plate of the embodiment according to FIG. 5.

In this embodiment, in the case of a flow reading, the home position of scanning unit 52 including the light source 53 and the mirror 54 can be switched and set to the first position that is below the gray color area 26G of the reading opposite plate 26 shown in FIG. 6 or the second position that is below the white color area 26W shown in FIG. 7. That is to say, the home position of the scanning unit 52 can be switched and set to the first position (FIG. 6) or the second position (FIG. 7).

In this embodiment, it is noted that the actual distance between the first position and the second positions is 3 to 5 mm as one example.

In addition, in order to switch the home position of the scanning unit 52 of the image reader 12 to the first position or the second position in this way, it is sufficient to change an initial value given to a stepping motor (not shown) that controls movement of the scanning unit 52 in the sub scanning direction.

In this example, in a case where a mode to perform a crop processing is selected by a user, the home position of the scanning unit 52 is first set to the first position shown in FIG. 6 (below the gray area 26G of the reading opposite plate 26).

It is noted that a crop processing is referred to as a processing for cropping a document image from image data of a document read by the image reader 12 to obtain the document image in a correct posture.

Figure 8:
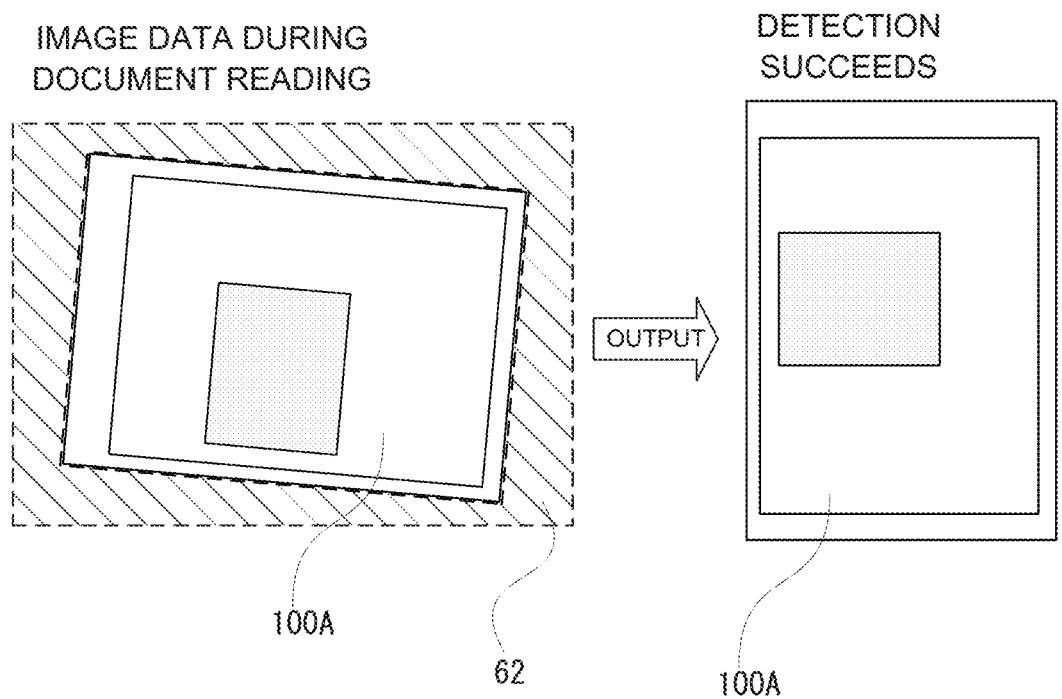
FIG. 8 is an illustrative diagram showing a case of succeeding in a document image detection (crop processing) of one sheet of a document according to this embodiment.

FIG. 8 shows an example of successfully cropping the document image in this crop processing, and in this case, since the home position of the scanning unit 52 is set to the first position, a color of a background 62 (background color) of the document image 100A is a gray color. On the other hand, in this case, a ground color of the document is a white color or has brightness near the white color. In a crop processing, since edges of a document image are detected on the basis of a difference in brightness (difference in density) between a color of the document image (ground color) and a background color of the document image, that will result in a success in clopping document images, that is to say, the clopping processing in a case where there is a large difference in brightness between the document image and the background color thereof, as shown in an example of FIG. 8.

As in this embodiment, in a case where a user selects a mode of a crop processing, the home position of scanning unit 52 is first set to the first position, so that the probability of succeeding in the crop processing can be enhanced on the basis of a fact that in many cases, a color of the document is a white color or is a color that has brightness near the white color.

Figure 9A:
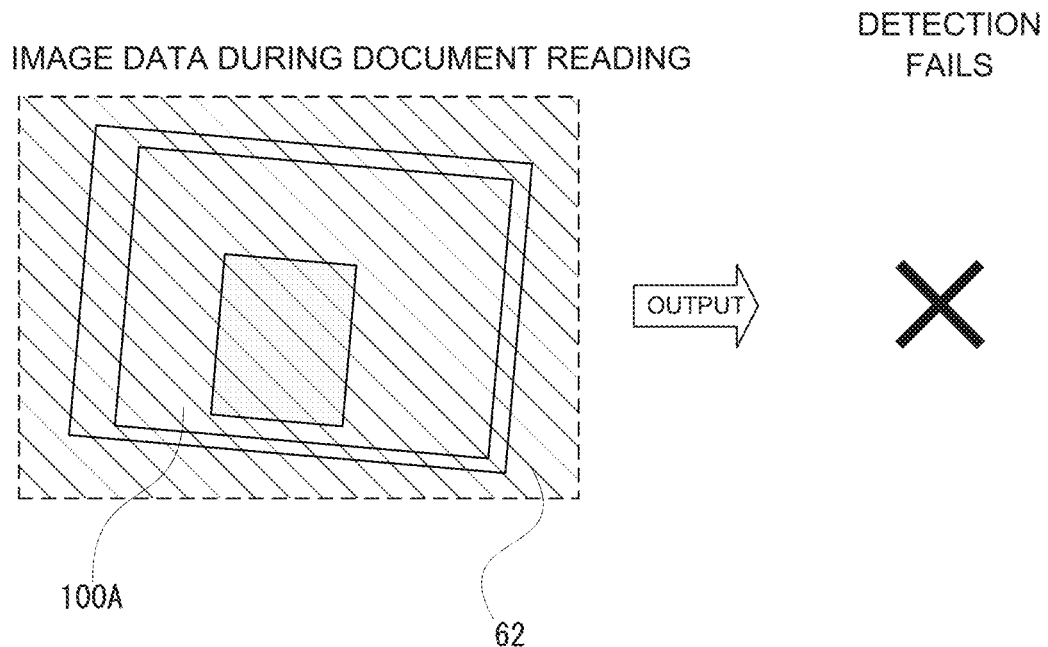

In an example shown in FIG. 9A, brightness of a ground color of a document is low, and brightness difference of the document image 100A is relatively low. On the other hand, the home position of the scanning unit 52 is also set at the first position in this case as well. Therefore, a color of the background 62 (background color) is a gray color and has a low brightness. Thus, at the time of a first reading, the difference in brightness between the document image 100A and the background color is small, and detection of the document image fails. In other words, the crop processing fails.

Figure 10:
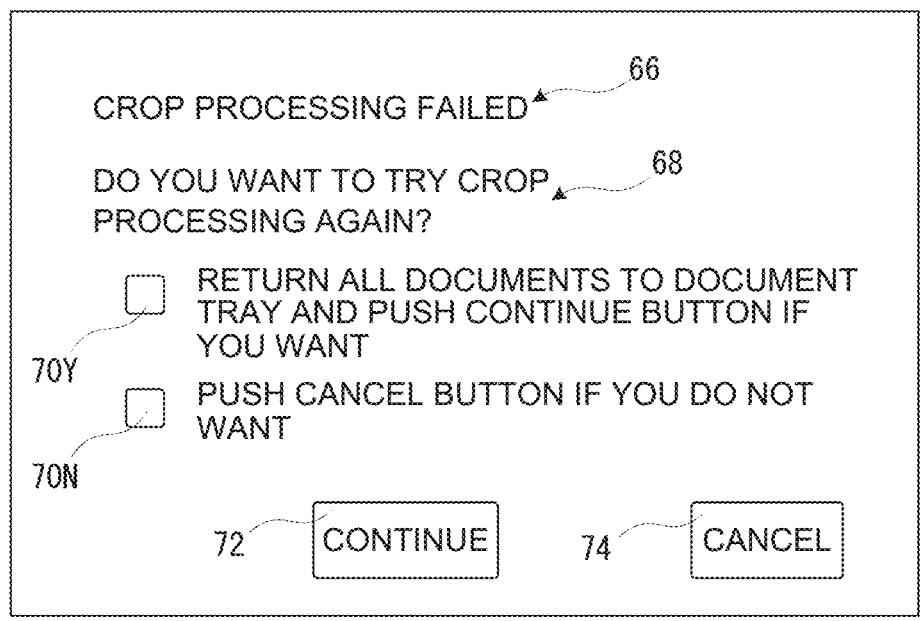
FIG. 10 is an illustrative diagram showing one example of an error screen that informs a failure in a document image detection (crop processing).

Therefore, the image forming apparatus 10 displays an error screen 64 as shown in FIG. 10 on a display 19 (FIG. 1). This error screen 64 includes a message 66, "CROP PROCESSING FAILED" which informs a user who desires for a crop processing that the crop processing has failed.

On the other hand, a message 68, "DO YOU WANT TO TRY CROP PROCESSING AGAIN?" is displayed, and asks the user if he or she desires for the crop processing again.

In response to the message 68, the user expresses whether he or she desires to continue the cropping process or not.

If the cropping process is desired, the user can touch a touch panel on the display 19, and place a check mark in a check box 70Y as well as operate a continue button 72. At this time, since the document needs to be read again, the user must follow the message and return all the documents to the document placement tray 34 (FIG. 2).

If the user does not desire to do so, the user touches the touch panel on display 19, and places a check mark in a check box 70N as well as operates a cancel button 74.

In a case where the cancel button 74 is operated, the crop processing can end as it is.

In a case where all the documents are returned to the document placement tray 34 and the continue button 72 is operated, the image forming apparatus 10 (computer thereof) sets a home position of the scanning unit 52 to the second position for a second reading. At this time, the scanning unit 52 is arranged below the white color area 26W of the reading opposite plate 26. Then, as in the same case of the first reading, the document is read.

Figure 9B:
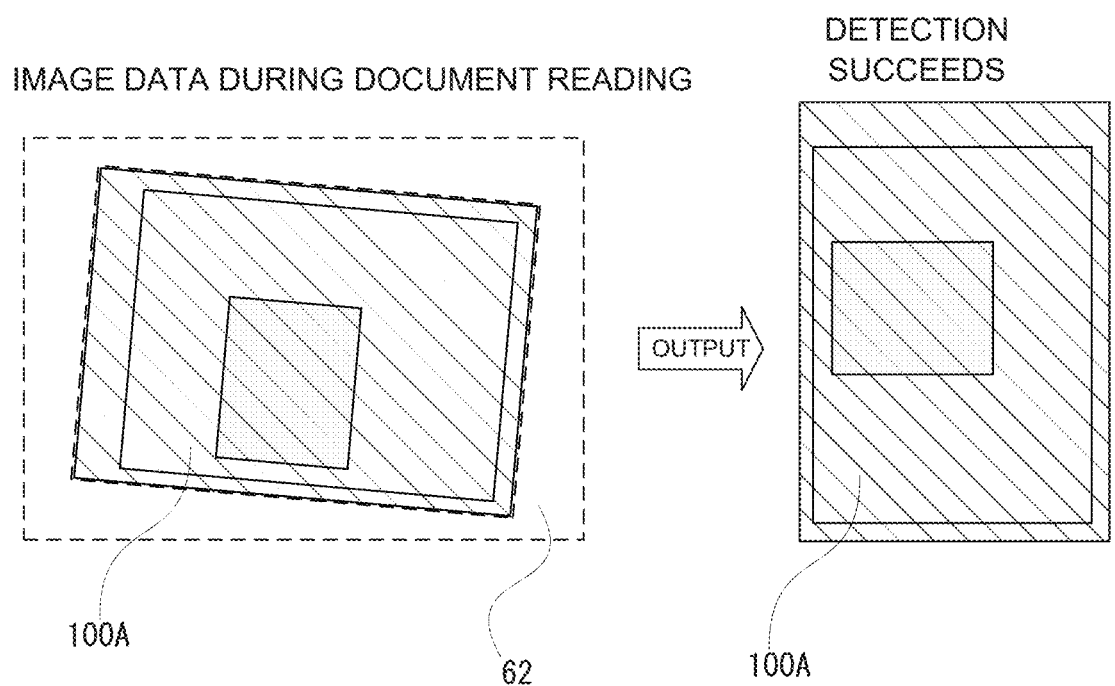

In the case of the second reading, the scanning unit 52 is positioned below the white color area 26W, and therefore, a color of the background 62 (background color) is a white color or has a high brightness near the white color. On the other hand, the brightness of the document image 100A is relatively low as mentioned in the above. The crop processing is successful in a case where there is a large difference in brightness between the document image and the background color thereof, as shown in FIG. 9B where the home position of the scanning unit 52 is set to the second position.

Since in a typical image forming apparatus, an opposite plate (equivalent to the reading opposite plate 26) is set to a single white color, taking it into consideration that a ground color of a document has a relatively high brightness like a white color in many cases, the difference in brightness between the document image and the background is relatively small, and therefore, it is not highly likely that the document image is successfully extracted.

In contrast, in this embodiment, the reading opposite plate 26 of the reading glass 16 is divided into an area with a relatively high brightness like the white color area 26W and an area with a relatively low brightness like the gray color area 26G in the sub scanning direction of the scanning unit 52, that is to say, in the document conveyance direction in a case of a flow reading, so that the home position of the scanning unit 52 can be switched to the first position below the gray color area 26G or the second position below the white color area 26W. Then, in the crop processing, the home position of scanning unit 52 is first set to the first position to perform an image reading of the document. Taking it into consideration that brightness is relatively higher such as in a white color, there is a large difference in brightness between the cropped document image 100A and the background 62, and therefore, the likelihood of success in the crop processing gets higher.

In a case where the crop processing failed with the home position of the scanning unit 52 set to the first position, it can be assumed that the brightness of the ground color of the document is low, if the home position of the scanning unit 52 is set to the second position in that case, the difference in brightness between the document image and the background can be ensured, so that the crop processing is highly likely to be successful in the second document reading.

Figure 11:
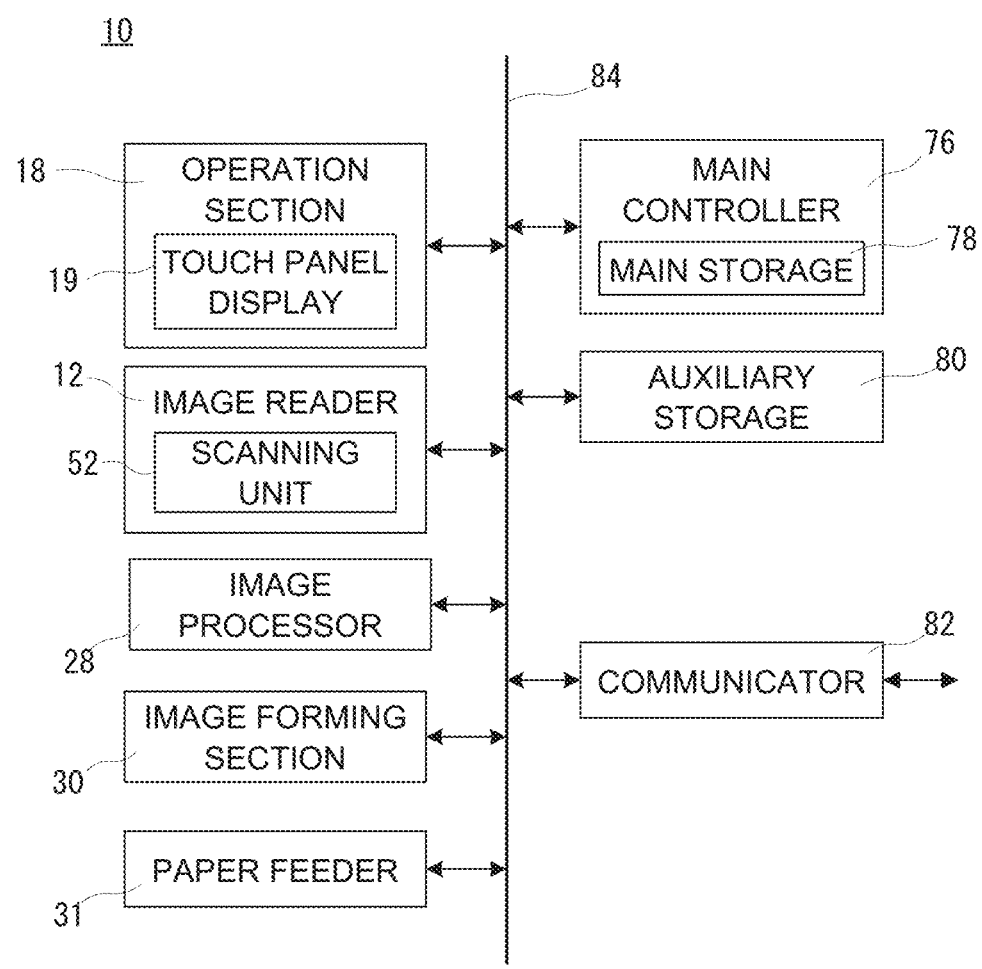
FIG. 11 is a block diagram showing one example of an electric configuration of an image forming apparatus according to this embodiment.

The image forming apparatus 10 according to the embodiment of FIG. 1 is a multifunction peripheral, and FIG. 11 is a block diagram showing one example of an electric configuration of the image forming apparatus 10. The image forming apparatus 10 includes an image reader 12, an image processing section 28, an image forming section 30, and a paper feeder 31. The image forming apparatus 10 also has a main controller 76 (including a main storage 78), an auxiliary storage 80, and a communicator 82. In addition, the image forming apparatus 10 is provided with an operation section 18. These are connected to each other via a common bus 84.

As already described, the image reader 12 reads images of a document to output two-dimensional image data corresponding to the images of the document.

The image forming section 30 is an image-forming means that forms images on a recording paper by an electrophotographic method. Therefore, the image forming section 30 includes a photosensitive drum, a charging apparatus, an exposure apparatus, a developing apparatus, a transfer apparatus, and a fixing apparatus, all of which are not shown. Image data subject to an image forming processing by this image forming section 30 is, for example, image data output from the image reader 12.

The paper feeder 31 feeds every one sheet of recording papers into the image forming section 30.

The communicator 82 is a communication means that can perform a bidirectional communication processing via a network (not shown). In addition, the communicator 82 can also perform communication using a wireless method, such as a Wi-Fi (registered trademark) method.

The main controller 76 is a control means that entirely controls the entire image forming apparatus 10. Therefore, the main controller 76 is a CPU or a processor, and constitutes a computer together with the main storage 78. The main storage 78 also includes, for example, a RAM and a ROM.

The auxiliary storage 80 is, an auxiliary storage means including, for example, a hard disk and a flash memory. This auxiliary storage 80 stores as appropriate, for example, various types of image data such as image data output from the image reader 12 and various types of data other than the image data in accordance with control by the main controller 76.

The operation section 18 has the display 19 with a touch panel, as described above. Moreover, the operation section 18 may include an appropriate hardware switch such as a push button switch other than the touch panel.

Figure 12:
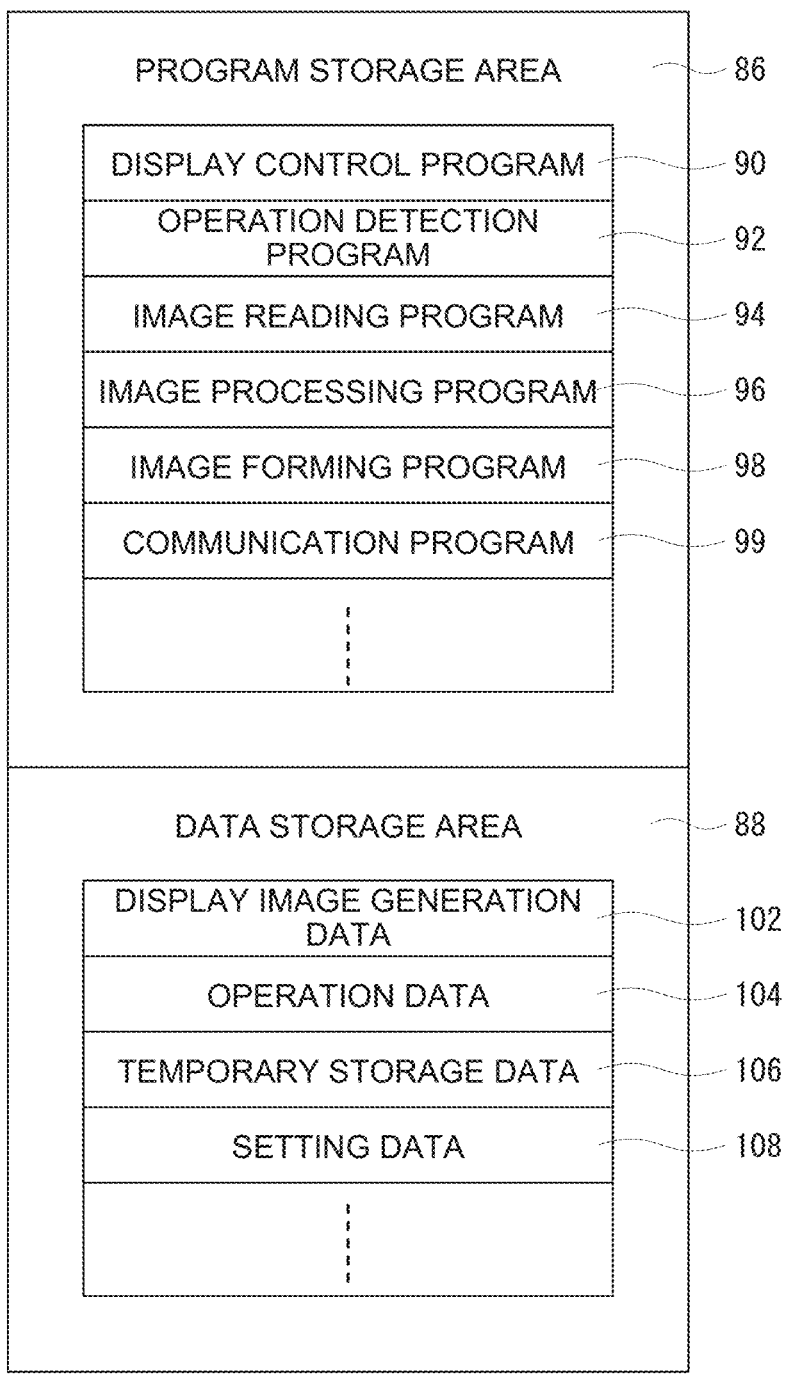
FIG. 12 is an illustrative diagram showing one example of a memory map of a main storage of FIG. 11.

FIG. 12 is an illustrative diagram showing one example of a memory map of the main storage (RAM) 78 according to the embodiment of FIG. 11.

As illustrated in FIG. 12, the main storage 78 includes a program storage area 86 and a data storage area 88. The program storage area 86 stores a control program of the image forming apparatus 10.

The control program of the image forming apparatus 10 includes a display control program 90, an operation detection program 92, an image reading program 94, an image processing program 96, an image forming program 98, and a communication program 99.

The display control program 90 is a program that generates display screen data required for displaying various kinds of screens on a screen of the display 19 on the basis of display image generation data and the like in a display image generation data storage area 102, which is described later to display images on the display 19 using the display screen data.

The operation detection program 92 is a program that detects operation data corresponding to operations on the operation section 18 to store the operation data in an operation data storage area 104, which is described later. For example, in a case where a touch panel (not shown) is touched, the main controller 76 (computer) obtains as operation data touch coordinate data output from the touch panel in accordance with the operation detection program 92 to store the data as the operation data in the operation data storage area 104. In addition, when a hardware button or a key (not shown) included in the operation section 18 is pressed or operated, the main controller 76 obtains operation data due to pressing or operating the hardware button or the key in accordance with the operation detection program 92 to store the operation data in the operation data storage area 104.

The image reading program 94 controls the automatic document feeder 38 and the image reader 12 (both shown in FIG. 3) to read a document placed on the document placement tray 34 or the document table 14, and stores data of the read document image 100A together with background image data of the background 62 (FIG. 8, FIG. 9) in a temporary stored data area 106.

The image processing program 96 mainly performs a pre-processing for image forming by the image forming section 30 such as a crop processing for image data read in accordance with the image reading program 94. The crop processing will be described with reference to flow diagrams of FIG. 13 to FIG. 15.

The image forming program 98 is a program that controls the image forming section 30 to print image data on a recording paper supplied from the paper feeder 31.

The communication program 99 is a program that controls the communicator 82 to communicate with another image forming apparatus, an information processing apparatus (server), and the like via a network (not shown).

Although not shown, a program storage area 86 also stores other programs required for controlling the image forming apparatus 10.

The data storage area 88 has a display image generation data storage area 102, an operation data storage area 104, a temporary stored data area 106, a setting data storage area 108, and the like set therein.

Display image generation data in the display image generation data storage area 102 includes polygon data, texture data, and the like for generating display images. In addition, the display image generation data includes image data corresponding to a software key and image generation data for displaying each screen such as the error screen 64 described above.

Operation data in the operation data storage area 104 is operation data that is detected in accordance with the operation detection program 92 and that is stored in accordance with a chronological order. It is noted that the operation data is deleted after being used in a processing performed by the main controller 76.

The temporary stored data area 106 temporarily stores image data and the like read by the image reader 12, for example, for an image processing performed by the image processing program 96.

The setting data storage area 108 stores setting data including various kinds of parameters set by a user using the operation section 18 such as copy density and enlargement/reduction.

It is noted that although not illustrated, the data storage area 88 not only stores other data required for executing control programs of the image forming apparatus 10 but also has a flag and a counter (timer) required for executing the control programs provided therein. As the flag, a detection flag that indicates whether a detection of document images (cropping) has succeeded or failed at the first reading can be exemplified. In a case where this detection flag is on, it will be indicated that the detection succeeds, and in a case where this detection flag is off, it will be indicated that the detection fails.

Figure 13:
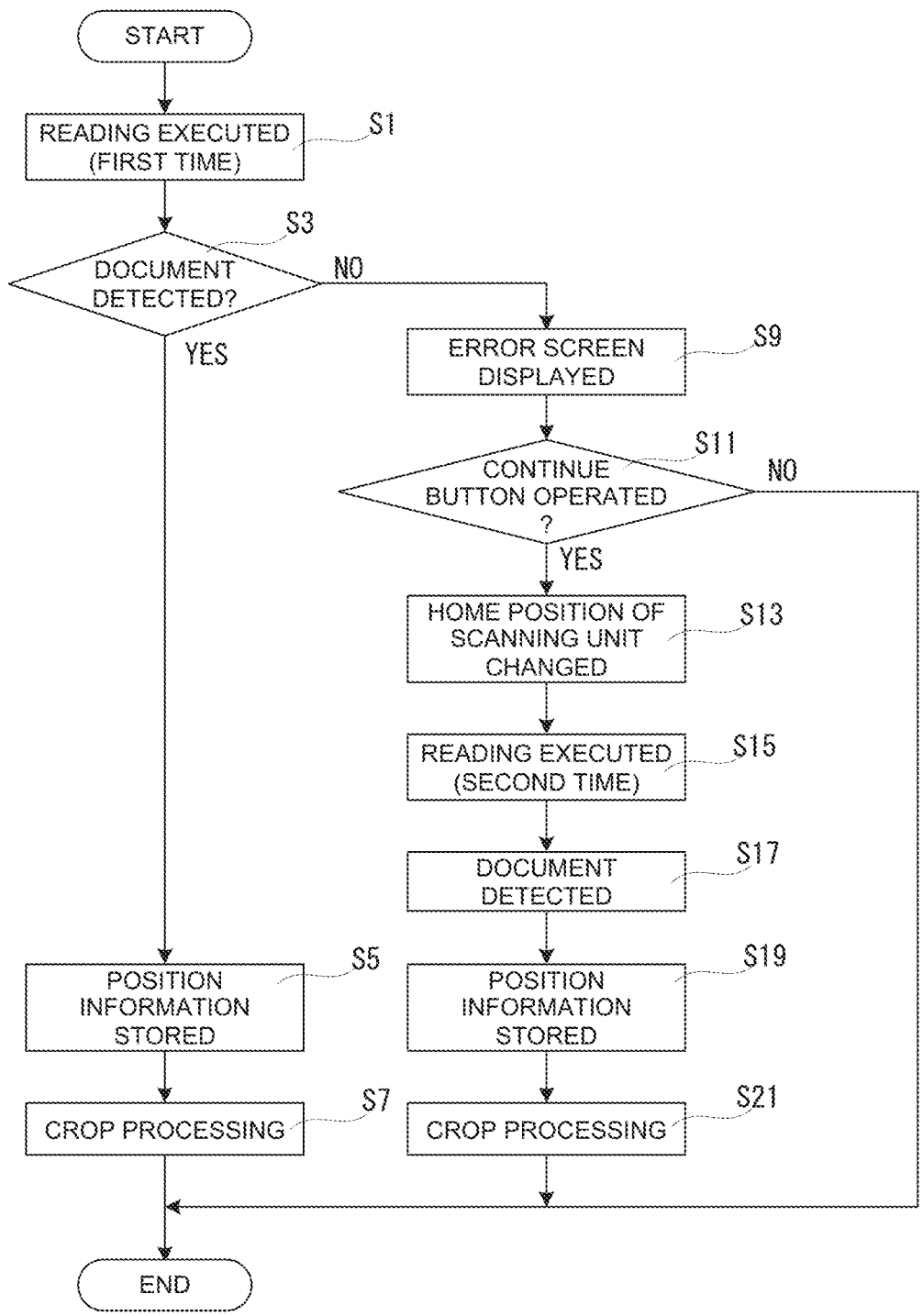
FIG. 13 is a flow diagram showing one example of an operation of an image processing (crop processing) in a case where there is only one sheet in a document according to this embodiment.

Next, with reference to FIG. 13, a crop processing operation is described in a case where a document is composed of one sheet. Since this operation in FIG. 13 is initiated by a user who desires for a crop processing, a home position of the scanning unit 52 of the image reader 12 is set to the first position shown in FIG. 6.

In the first step S1, the main controller 76 (FIG. 11) controls the image reader 12 in accordance with the image reading program 94 to read an image of a document set on the document placement tray 34 (FIG. 3). That is to say, a first reading is performed. This step S1, in which the main controller 76 controls the document reader 12 to read the document at the reading position P1 (FIG. 3), functions as a first reading execution section. Image data of the document, together with image data of the background 62 (FIG. 8), is stored in the temporary stored data area 106 (FIG. 12).

In the next step S3, the main controller 76 controls the image processing section 28 in accordance with the image processing program 96 to execute a processing for detecting a document image in the image data stored in the temporary stored data area 106, and determines whether the document image can be detected. In a case where edges of the document image can be detected, it is followed by the next step S5.

That is to say, in this step S3, the main controller 76 functions as a detection section since the main controller 76 controls the image processing section 28 to perform a processing for detecting the document image as well as functions as a determination section since the detection section determines whether the document image has been detected.

In step S3, in a case where "YES" is determined, it means that a difference in brightness between brightness of the document image and brightness of the background image is above a certain level, and in that case, in step S5, the main controller 76 stores in the temporary stored data area 106 position data of the document image, for example, coordinate data of each position indicating a shape of the document image.

Then, in step S7, the main controller 76 performs a crop processing by a well-known method in accordance with the position data of the document image stored in step S5. For example, the document image is rotated so that each one of inclinations thereof with respect to an X axis and a Y axis can be within a predetermined angle.

In a case where "NO" is determined in step S3, the main controller 76 displays the error screen 64 shown in FIG. 10 in step S9. Then, in step S11, the main controller 76 refers to operation data in the operation data storage area 104 and determines whether a user has operated the continue button 72.

In a case where "NO" is determined in step S11, that is to say, in a case where the user has operated the cancel button 74, the crop processing ends as it is.

In a case where "YES" is determined in step S11, that is to say, it means that the document has been returned to the document placement tray 34 to operate the continue button 72 in accordance with the error screen 64.

Then, in step S13, the main controller 76 sets a home position of the scanning unit 52 of the image reader 12 is set to the second position shown in FIG. 7, that is to say, below the white color area 26W of the reading opposing plate 26 in accordance with the image processing program 96.

Then, in step S15, as in step S1, the image reader 12 reads the image of the document set on the document placement tray 34. The fact that the detection of the document image failed at the first reading ("NO" in step S3) means that there was no large difference in brightness between the document image 100A and the background color as shown in FIG. 9A. This means that while the background color was gray, the ground color of the document had brightness near the background color. At the second reading, since the background color becomes a white color, the document image that had no difference in brightness against the gray background color has a difference in brightness above a certain level against the white background color. In other words, at the second reading, the image processing section 28 is highly likely to succeed in cropping the document image.

That is to say, the second reading is performed in step S15. This step S15, in which the main controller 76 controls the document reader 12 to read the document at the reading position P1 (FIG. 3), functions as a second reading execution section.

Then, in step S17, the main controller 76 detects the document image on the basis of the image data stored in the temporary stored data area 106. In this step S17 as well, as in the previous step S3, the main controller 76 controls the image processing section 28 to detect the document image from the image data. This step S17 functions as a detection section.

Then, in step S19, as in step S5, the position information of the document image is stored as well as in step S21, as in step S7, the crop processing is performed.

Thus, even though the crop processing fails at the first reading in which the background color to be read was a gray color, the probability of succeeding in the crop processing can be enhanced if the background color to be read is a white color at the second reading.

Figure 14:
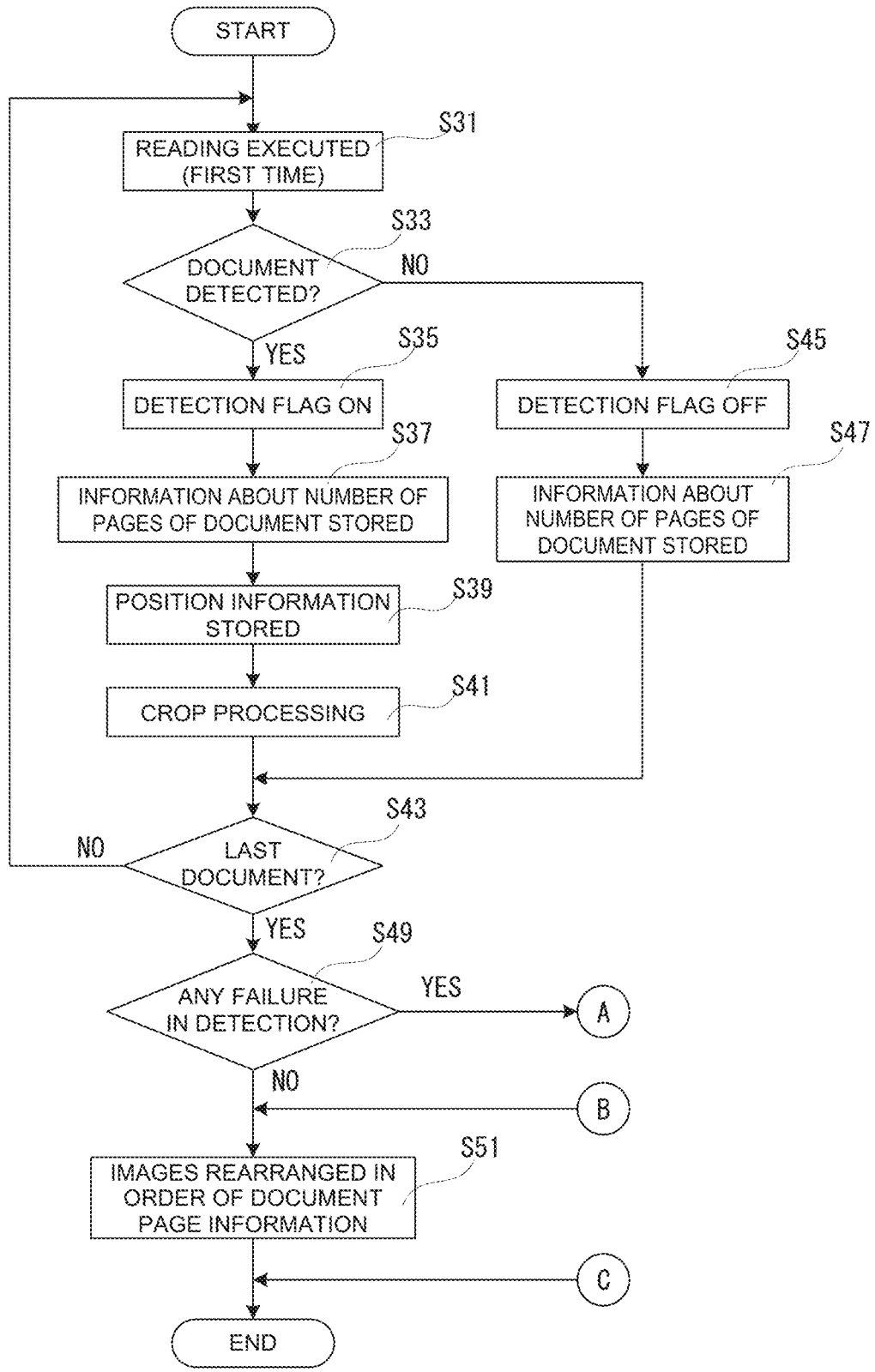
FIG. 14 is a flow diagram showing one example of a part of an operation of an image processing (crop processing) in a case where a document has a plurality of sheets according to this embodiment.
Figure 15:
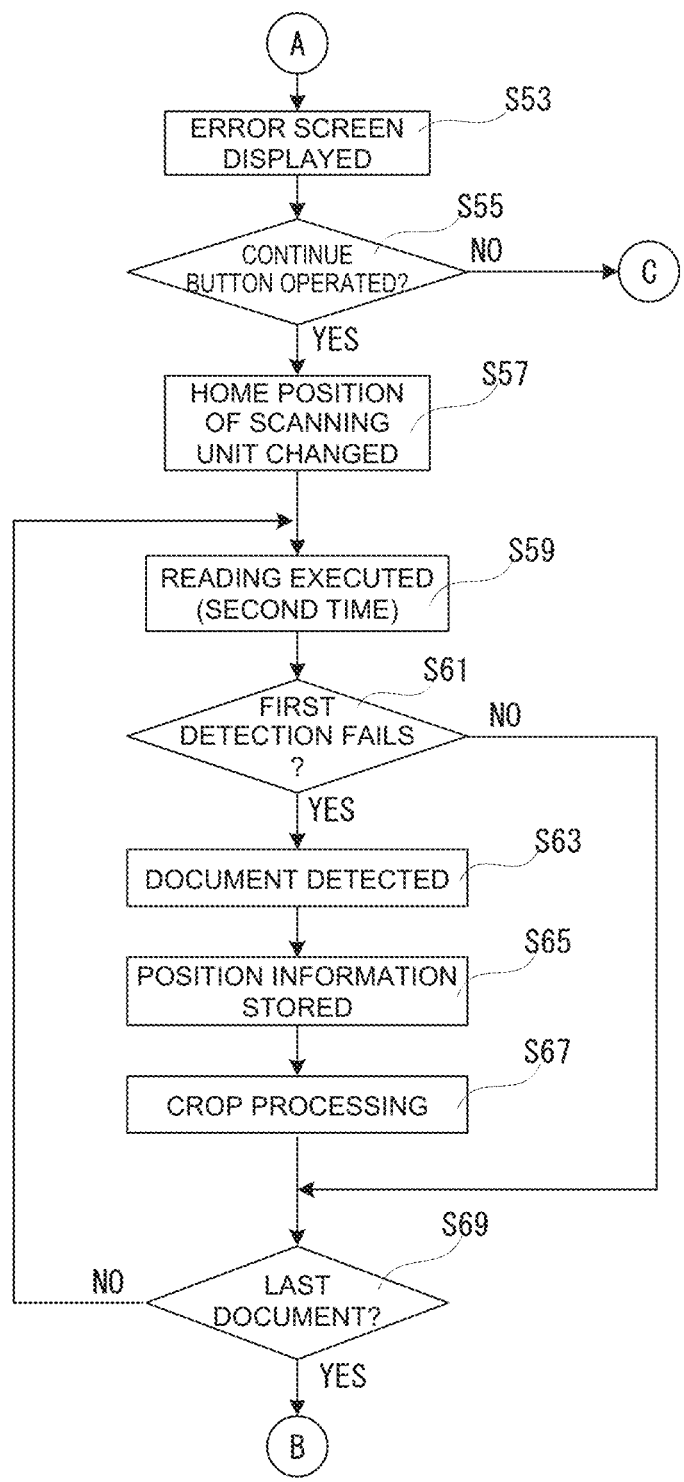
FIG. 15 is a flow diagram showing the rest part of an operation of an image processing (crop processing) in a case where there are a plurality of sheets in a document according to this embodiment.

An operation in a case of reading two or more sheets of a document will be described below with reference to FIG. 14 and FIG. 15. Since the operations shown in FIG. 14 and FIG. 15 is initiated by a user who desires to perform a crop processing, a home position of the scanning unit 52 of the image reader 12 is set to the first position shown in FIG. 6.

In the first step S31, the main controller 76 (FIG. 11) controls the image reader 12 in accordance with the image reading program 94 to read an image of a document set on the document placement tray 34 (FIG. 3). That is to say, a first reading is performed. This step S31, in which the main controller 76 controls the document reader 12 to read the document at the reading position P1 (FIG. 3), functions as a first reading execution section. The image data of this document image, together with image data of the background 62 (FIG. 8), is stored in the temporary stored data area 106 (FIG. 12).

In the next step S33, the main controller 76 controls the image processing section 28 to perform a processing for detecting a document image in the image data stored in the temporary stored data area 106, and determines whether the document image can be detected. In a case where edges of the document image can be detected, it is followed by the next step S35.

That is to say, in this step S33, the main controller 76 functions as a detection section since the main controller 76 controls the image processing section 28 to detect the document image as well as functions as a determination section since the detection section determines whether the document image has been detected.

In a case where "YES" is determined in step S33, it means that a difference in brightness between brightness of the document image and brightness of the background image is above a certain level, and in that case, in step S35, the main controller 76 turns on a detection flag (indicating whether edges of the document image have been able to be detected) as well as stores the read document image data in the temporary stored data area 106.

Then, in step S37, information about the number of pages of the document is stored in the temporary stored data area 106. This information about the number of pages can be counted by the automatic document feeder 38 or can be counted from the cropped document image data.

Then, in steps S39 and S41, as in the previous steps S5 and S7, the position information of each page of the document image is stored as well as the crop processing is performed by a well-known method.

Then, in the next step S43, it is determined whether the crop processing has been performed up to the last page of the document placed on the document placement tray 34, and in a case where "NO" is determined, the processing returns to the previous step S31, and processing up to step S41 is repeatedly performed in the same way.

It is noted that in a case where "NO" is determined in the previous step S33, that is to say, in a case where the document image has not been able to be detected, the detection flag is turned off in step S45 as well as in step S47, the information on the number of the failed pages is stored in the temporary stored data area 106.

In a case where the crop processing is performed up to the last page, and "YES" is determined in step S43, it is determined in the following step S49 whether any detection failure has occurred. This can be determined by the main controller 76 referring to the detection flag. In a case where "YES" is determined in this step S49, that is to say, in a case where the detection flag is turned off, it is followed by the next step S53 shown in FIG. 15.

In a case where "NO" is determined in step S49, that is to say, in a case where there is no page where any detection has failed, in step S51, the document images are rearranged in an order of the page information to be stored in the temporary stored data area 106.

In a case where "YES" is determined in step S49, the error screen 64 shown in FIG. 10 is displayed on the display 19 in step S53.

In step S53, the error screen 64 is displayed, and in step S55, the main controller 76 refers to the operation data in the operation data storage area 104 and determines whether a user has operated the continue button 72.

In a case where "NO" is determined in step S55, that is to say, in a case where the user has operated the cancel button 74, the crop processing ends as it is.

In a case where "YES" is determined in step S55, that is to say, it means that all the documents have been returned to the document placement tray 34 to operate the continue button 72 in accordance with the error screen 64.

Then, in step S57, the main controller 76 sets a home position of the scanning unit 52 of the image reader 12 is set to the second position shown in FIG. 7, that is to say, below the white color area 26W of the reading opposite plate 26 in accordance with the image processing program 96.

Then, in step S59, as in step S31, the image reader 12 reads the image of the document set on the document placement tray 34. The fact that the detection of the document image failed at the first reading ("NO" in step S33) means that there was no large difference in brightness between the document image 100A and the background color as shown in FIG. 9A. This means that while the background color was gray, the ground color of the document had brightness near the background color. At the second reading, since the background color becomes a white color, the document image that had no difference in brightness against the gray background color has a difference in brightness above a certain level against the white background color. In other words, at the second reading, the image processing section 28 is highly likely to succeed in cropping the document image.

In other words, the second reading is performed in step S59. This step S59, in which the main controller 76 controls the document reader 12 to read the document at the reading position P1 (FIG. 3), functions as a second reading execution section.

In the next step S61, with reference to detection flags, it is determined whether cropping the document image of the page failed at the first time. In a case where it failed, the detection flag should have been turned off. Therefore, in step S61 it is determined whether the detection flag has been turned off.

Then, in step S63, the document image is detected from the document image data. That is to say, in this step S63, a document on a page where failure occurred in detecting the document at the first reading is detected. This step S63, in which the main controller 76 controls the image processing section 28 to detect the document image from the image data, functions as a detection section.

Then, in step S65, as in step S5 and step S19, the position information of the document image is stored as well as in step S67, as in step S7 and step S21, the crop processing is performed.

In a case where it is determined in step S69 that the crop processing has been performed up to the last page of the document, the crop processing ends.

Thus, even though the crop processing failed at the first reading in which the background color to be read was a gray color, the probability of succeeding in the crop processing can be enhanced if the background color to be read is a white color at the second reading.

It is noted that in the above-mentioned embodiments, the white color area 26W and the gray area 26G are formed adjacent to each other in a conveyance direction of the document on the reading opposite plate 26 in a case of a flow reading in the sub scanning direction of the scanning unit 52, so that the two areas having a difference in brightness is formed in the sub scanning direction of the scanning unit 52, that is to say, in the conveyance direction of the document. However, it is not limited to a white color area and a gray color area to form these two areas having a difference in brightness. In short, it is noted that on an opposing surface of the reading opposite plate (26) to the reading glass 16, a low brightness area and a high brightness area having a higher brightness than the low brightness area are formed adjacent to each other in the sub scanning direction of the scanning unit 52 (in a conveyance direction of a document).

What is claimed is:

1. An image forming apparatus using a flow reading method that reads a document by irradiating the document with light from a scanning unit, at a reading position set in a conveyance path, the image forming apparatus comprising:
   a conveyor that conveys the document along the conveyance path;
   a light transmitting member that is provided below the conveyance path at the reading position;
   an opposite plate that is provided opposite the light transmitting member and that allows the document that is being conveyed to pass between the opposite plate and the light transmitting member, wherein
   on a surface of the opposite plate that is opposite the light transmitting member, a low brightness area and a high brightness area having a higher brightness than the low brightness area are formed adjacent to each other in a conveyance direction of the document;
   first reading execution circuitry that sets a home position of the scanning unit to a first position corresponding to the low brightness area to read the document passing through the reading position by an image reader;
   determination circuitry that determines whether a document image is detected based on image data obtained at a time of a first reading by the first reading execution circuitry; and
   second reading execution circuitry that set the home position of the scanning unit to a second position corresponding to the high brightness area to read the document passing through the reading position by the image reader in a case that the determination circuitry determines, based on the image data, that the document image is not detected.

2. A control method for an image forming apparatus using a flow reading method that reads a document by irradiating the document with light from a scanning unit, at a reading position set in a conveyance path, the image forming apparatus comprising: a conveyor that conveys the document along the conveyance path; a light transmitting member that is provided below the conveyance path at the reading position; and an opposite plate that is provided opposite the light transmitting member and that allows the document that is being conveyed to pass between the opposite plate and the light transmitting member, wherein on a surface of the opposite plate that is opposite the light transmitting member, a low brightness area and a high brightness area having a higher brightness than the low brightness area are formed adjacent to each other in a conveyance direction of the document, the control method comprising:

setting a home position of the scanning unit to a first position corresponding to the low brightness area to perform a first reading of the document passing through the reading position by an image reader;

determining whether a document image is detected based on image data obtained at a time of the first reading; and setting the home position of the scanning unit to a second position corresponding to the high brightness area to perform a second reading of the document passing through the reading position by the image reader in a case that the document image, based on the image data, is determined as not to be detected.

3. A non-transitory computer-readable medium storing one or more instructions for an image forming apparatus that uses a flow reading method to read a document by irradiating the document with light from a scanning unit, at a reading position set in a conveyance path, the image forming apparatus comprising:

a conveyor that conveys the document along the conveyance path;

a light transmitting member that is provided below the conveyance path at the reading position; and an opposite plate that is provided opposite the light transmitting member and that allows the document that is being conveyed to pass between the opposite plate and the light transmitting member, wherein on a surface of the opposite plate that is opposite the light transmitting member, a low brightness area and a high brightness area having a higher brightness than the low brightness area are formed adjacent to each other in a conveyance direction of the document, and the one or more instructions when executed by at least one processor of the image forming apparatus, cause the image forming apparatus to set a home position of the scanning unit to a first position corresponding to the low brightness area to read the document passing through the reading position by an image reader, determines whether a document image is detected based on image data obtained at a time of a first reading by the at least one processor, and set the home position of the scanning unit to a second position corresponding to the high brightness area to read the document passing through the reading position by the image reader in a case that the document image, based on the image data, is determined as not to be detected.

* * * * *